(12) United States Patent  (10) Patent No.: US 9,310,179 B2
Leuthold  (45) Date of Patent: Apr. 12, 2016

(54) SPINDLE FORCE ACTUATOR

(71) Applicant: Seagate Technology LLC, Cupertino, CA (US)

(72) Inventor: Hans Leuthold, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 592 days.

(21) Appl. No.: 13/733,513

(22) Filed: Jan. 3, 2013

(65) Prior Publication Data

US 2013/0193958 A1 Aug. 1, 2013

Related U.S. Application Data

(63) Continuation-in-part of application No. 13/363,713, filed on Feb. 1, 2012, now Pat. No. 9,163,925.

(51) Int. Cl.
G01B 7/14 (2006.01)
G11B 19/20 (2006.01)
G11B 5/596 (2006.01)
G01D 5/14 (2006.01)

(52) U.S. Cl.
CPC .............. *G01B 7/14* (2013.01); *G11B 5/59627* (2013.01); *G11B 19/20* (2013.01); *G01D 5/145* (2013.01)

(58) Field of Classification Search
CPC ....................................................... G01B 7/14
See application file for complete search history.

(56) References Cited

U.S. PATENT DOCUMENTS

| 4,983,916 | A  |   | 1/1991  | Iijima |  |
|---|---|---|---|---|---|
| 5,034,829 | A  |   | 7/1991  | Mahr |  |
| 5,736,800 | A  | * | 4/1998  | Iannello et al. | 310/90.5 |
| 5,962,940 | A  | * | 10/1999 | Imlach | 310/90.5 |
| 6,140,790 | A  |   | 10/2000 | Heine et al. |  |
| 6,170,162 | B1 |   | 1/2001  | Jacobsen et al. |  |
| 6,201,322 | B1 |   | 3/2001  | Heine et al. |  |
| 6,505,968 | B1 |   | 1/2003  | Fleury et al. |  |
| 6,592,430 | B1 |   | 7/2003  | Nakasuji et al. |  |
| 6,603,221 | B1 |   | 8/2003  | Liu |  |
| 6,603,225 | B2 |   | 8/2003  | Heine et al. |  |
| 7,046,477 | B2 |   | 5/2006  | Shibata |  |
| 7,155,826 | B2 |   | 1/2007  | Wehrfritz |  |
| 7,370,524 | B2 | * | 5/2008  | Hopkins | G05B 11/42 73/146.2 |
| 7,633,705 | B2 |   | 12/2009 | Sudo |  |
| 9,163,925 | B1 | * | 10/2015 | Leuthold | G01B 7/14 |
| 2002/0074883 | A1 | * | 6/2002 | Yamauchi et al. | 310/90.5 |
| 2005/0094523 | A1 |   | 5/2005 | Wu |  |
| 2009/0091287 | A1 | * | 4/2009 | Bastholm | F16H 25/2015 318/603 |
| 2009/0164145 | A1 | * | 6/2009 | Koo | G01M 13/04 702/41 |
| 2009/0237282 | A1 | * | 9/2009 | Hartlieb et al. | 341/143 |
| 2011/0141617 | A1 |   | 6/2011 | Sudo |  |
| 2014/0077822 | A1 | * | 3/2014 | Leuthold | G01B 7/023 324/609 |
| 2014/0139237 | A1 | * | 5/2014 | Leuthold | G01B 7/023 324/609 |

* cited by examiner

Primary Examiner — Jermele M Hollington

(57) ABSTRACT

An apparatus includes a circuit, a code modulator, and an actuator. The circuit is operable to detect displacements of a rotating object while in motion. The circuit is operable to detect a position of the displacements and to generate a signal associated therewith. The code modulator is operable to generate a modulated signal based on the position and the displacements. The actuator is operable to apply a force to the rotating object, wherein the force is based on the modulated signal.

20 Claims, 8 Drawing Sheets

100

SPINDLE FORCE ACTUATOR

RELATED U.S. PATENT APPLICATION

This application claims the benefit and priority to co-pending, commonly-owned U.S. patent application Ser. No. 13/363,713, filed on Feb. 1, 2012, by Leuthold et al., and entitled "Electric Field Measurement Apparatus," assigned to the same assignee, which is incorporated herein by reference in its entirety.

BACKGROUND

In magnetic recording media, as used in hard disk storage devices, information is written to and read from magnetic elements that represent digital bits. In order to increase the amount of information that can be stored within a given area, the size and distance between these magnetic elements may be reduced so that they may be more densely positioned. At the same time, in order to increase production volume and decrease production cost, the speed at which disks are written to and read from when preparing the disks for use by an end-user may be increased. Thus, accurate location information as a function of time of the spin axis of the disks is useful.

One way to increase disk production volume and decrease production cost is by increasing the speed at which the disks rotate. Accordingly, more magnetic elements may be accessed within a certain amount of time, thereby yielding more completed disks within the same amount of time. Another way to increase disk production volume and decrease production cost is by performing the same operations on more disks simultaneously, thereby requiring less manufacturing equipment.

SUMMARY

An apparatus includes a circuit, a code modulator, and an actuator. The circuit may be operable to detect displacements of a rotating object while in motion. The circuit may further be operable to detect a position of the displacements. According to one embodiment, the circuit is further operable to generate a signal associated with the position and the displacements. The code modulator may be operable to generate a modulated signal based on the position and the displacements. The actuator may be operable to apply a force to the rotating object. The force may be based on the modulated signal.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Figure 1:
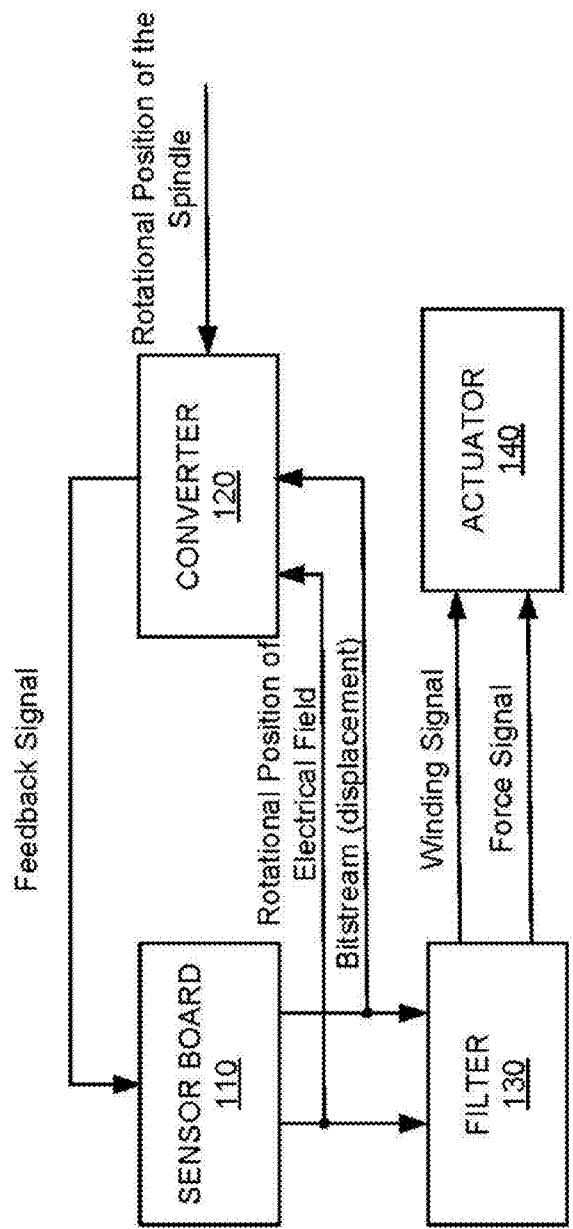
FIG. 1 shows an apparatus for adjusting displacement motion of a rotating object in accordance with one embodiment.

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the terms "axially" or "axial direction" refer to a direction along a centerline axis length of a shaft and "radially" or "radial direction" refer to a direction perpendicular to the centerline axis. The term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

In general, increasing the speed at which the disks rotate or performing the same operations on more disks simultaneously require more energy, which in turn increases the noise and vibration in the disks' environment. The interferences caused by rapid disk rotation and other interferences may cause random radial displacement or eccentricity of the rotating disk, resulting in non-repetitive run-out. As a result, in combination with the increasingly small size and proximate positions of the magnetic elements, the non-repetitive run-out may interfere with the accurate writing and reading of information stored on the disks, during their various manufacturing phases. In order to improve performance, amplitude of error motions, e.g., non-repetitive run-out, should be reduced.

Rotating spindles may have a number of different resonance modes, e.g., 8 modes. A resonance mode may be defined as a response of a rotating object, e.g., spindle motor, characterized as a shape of a motion, e.g., pivoting sideways, up/down motions, precession motion, etc., at a given frequency. Resonance is the tendency of a system to oscillate at a greater amplitude at some frequencies than at others. These are known as the system's resonant frequencies. At these frequencies, even small periodic driving forces can produce large amplitude oscillations, because the system stores vibrational energy. However, various physical conditions may change the number and the characteristics of the resonance modes. For example, adding a disk stack may add at least two additional modes.

In order to improve performance, the biggest modes (e.g., the dominant modes), that store the majority of vibrational energy of the system that contribute to non-repetitive run-out, e.g., the spectrum of the path traveled by the cantilevered end of the spin axis, may be attenuated by increasing the dampening force. Damper burns the energy from motion and applies the force at the right moment in order to compensate for displacement, thereby reducing the vibrational energy stored in the system over time. Moreover, increasing dampening attenuates the amplitude and widens the phase change of the response as opposed to an active bearing element.

In various embodiments, non-repetitive run-out may have two dominant modes. It is appreciated that suppressing the two dominant modes, as described by embodiments herein, is exemplary and not intended to limit the scope of the present invention. For example, one, three, four, five, or more dominant modes may be suppressed, if desired.

Force may be expressed as:

$$F = \ddot{W}.m + \dot{W}.C + W.k \qquad \text{Eqn.(1)}$$

where the first term is related to the force related to mass, the second term is related to the dampening force, and the third term is related to the bearing force. Thus, in various embodiments, the performance of a system may be improved by altering various terms of the force equation (1) above. However, in some embodiments described herein, system performance may be improved by removing vibrational energy from the system by increasing the dampening force (e.g., $\dot{W}.C$ in equation (1)). The two biggest modes contributing to non-repetitive run-out in X and Y direction with or without angular motion may be expressed as:

$$W(t) = x(t) + jy(t) \qquad \text{Eqn. (2).}$$

Angular motion may be defined in an analogous way as rotation about the X and/or Y axis. In order to determine the dampening force, the velocity at which displacement occurs is determined, e.g., $\dot{W}$. Accordingly, reducing or minimizing the area defined by Eqn. (2) attenuates the two biggest modes contained in that area, in X and Y direction, that contribute to non-repetitive run-outs. In order to identify where the two biggest modes occur, one may identify the frequencies at which they occur, e.g., two frequencies corresponding to the two biggest modes. Once the frequencies are identified, the area as defined by Eqn. (2) may be reduced to attenuate the biggest modes contributing to non-repetitive run-outs. Taking a Fourier transform of Eqn. (2) may be expressed as:

$$\text{Fourier}(x(t) + jy(t)) \rightarrow W(f) \qquad \text{Eqn. (3)}$$

and frequencies of W(f) that the two biggest mode occur as defined by Eqn. (3) may be determined.

Referring now to FIG. 1, an apparatus for adjusting displacement motion of a rotating object in accordance with one embodiment is shown. According to one embodiment, the rotating object is a spindle, however various embodiments may include any rotating object. The apparatus 100 may include a sensor board 110, a converter 120, a filter 130, and an actuator 140. It is appreciated that the description of a spindle in the embodiments herein is merely exemplary and not intended to limit the scope of the present invention. For example, the embodiments described herein are equally applicable to other rotating objects such as a rotor, motor, gyroscope, etc.

In one embodiment, the sensor board 110 detects displacement of the spindle. For example, the sensor board 110 may detect displacement of the spindle in the X-Y direction when the spindle is in motion. The sensor board 110 outputs this information as bit stream. The sensor board 110 may also determine the position of the spin axis of the spindle. It is appreciated that the sensor board 110 may utilize pressure and flow such as a microphone, it may utilize a magnetic field for sensing such as a Hall sensor, it may utilize an electric field such as charge coupling, or it may utilize optics such as optonics or laser, to name a few. However, in the described embodiments, a rotating electrical field is used to determine the position of the spin axis of the spindle.

The converter 120 may receive the information associated with the displacement of the spindle and the rotational position of the electrical field, as determined by the sensor board 110. Furthermore, the converter 120 may receive information regarding the spindle, e.g., rotational position of the spindle. Accordingly, the converter 120 generates a feedback signal that contains information regarding the shape of the electrical field and the shape of the spindle, which is stationary. As a result, the sensor board 110 may utilize the feedback signal to filter out stationary information, thereby outputting a bit stream containing only the changing portion of the signal. The bit stream generated contains the displacement of the spindle. The operation of the sensor board 110 and the converter 120 is described in greater detail in FIG. 2.

The filter 130 may receive information associated with the displacement and the position of the rotating electrical field. The filter 130 may determine the instantaneous velocity of a non-repetitive run-out of the spindle. The filter 130 may transmit information related to the instantaneous velocity. For example, the filter 130 may send a force pulse code modulation signal. The force pulse code modulation may include information regarding the location where a force is to be applied to the spindle, the magnitude of the force, which winding coils of the actuator 140 to activate, whether an even or odd winding is to be used by the actuator, etc. Alternatively, the force pulse code modulation may include information regarding the location where a force is applied to the spindle that generates the two dominant modes, the magnitude of the force, etc.

The actuator 140 generates a force in accordance with the force pulse code modulation and further based on the winding information, e.g., whether odd or even windings are to be used, in order to increase dampening force and reduce the system vibration. As such, the actuator 140 applies a force at a particular position of the actuator 140 to the spindle in order to compensate for the displacement of the spindle, thereby applying the appropriate dampening force. In this embodiment, the actuator 140 utilizes a magnetic field such as electromagnetic force. However, in other embodiments, the actuator 140 may utilize pressure and flow such as air jets, or it may utilize an electric field such as piezo element, to name a few.

Figure 2:
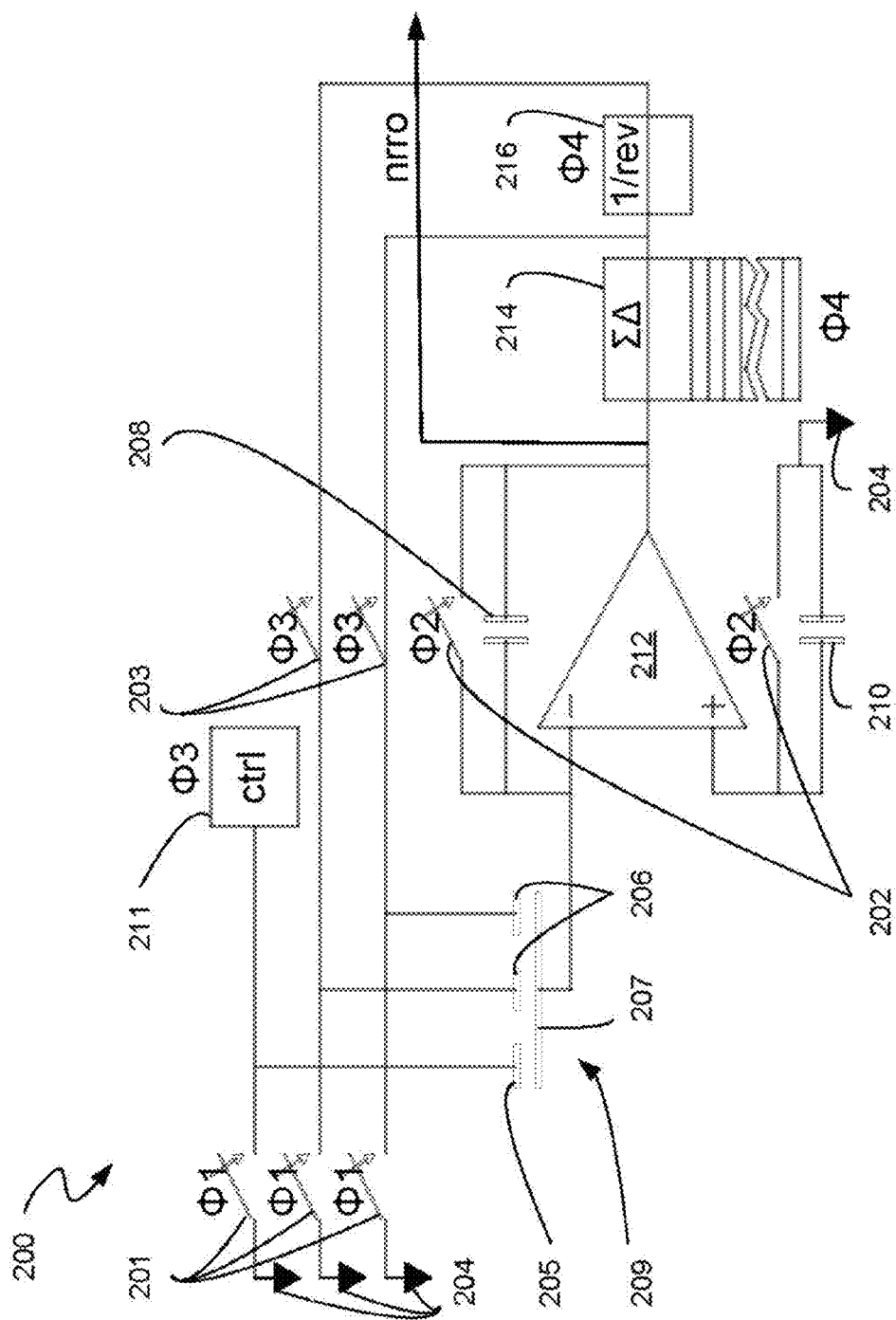
FIG. 2 shows a circuit for determining the displacement of a rotating object based on information provided by displacement sensors in accordance with one embodiment.

FIG. 2 is a schematic diagram of a circuit 200 that may be used to determine the displacement of a rotating disk based on information provided by displacement sensors, according to an embodiment of the present invention. Circuit 200 includes electrical ground nodes 204 and switches 201, 202, and 203. Circuit 200 further includes electrodes 205-207, capacitors 208 and 210, a sigma delta converter 214, integrator 212, a controller 211 and a 1/rev block 216.

When a clock signal, e.g., φ1, φ2, φ3, or φ4, goes high, the switch corresponding to that clock signal may close, i.e., thereby shorting the connection. Conversely, when a clock signal goes low, the switch corresponding to that clock signal may open.

Electrodes 205 may include biasing electrodes 205 and electrodes 206 may include sampling electrodes 206. The sampling electrodes 206 may correspond to or may be coupled with a first sensing ring and a second sensing ring (not shown). Electrodes 207 may include floating electrodes 207 that may correspond to or may be coupled with a floating ring (not shown). Accordingly, the capacitor 209 may correspond to the capacitor assembly formed between the first sensing ring, the second sensing ring, the biasing electrodes 205, and the floating electrodes 207. Additional capacitive components between each of the first sensing ring, the second sensing ring, the biasing electrodes 205, and the floating electrodes 207 are not shown for clarify of the figure.

Switches 203 open when the signal φ3 goes low. As a result, biasing electrodes 205 are caused to float. Approximately at the same time, signal φ4 goes low in preparation for its next rising edge. Once signal φ2 goes low, the switches 202 may open. Consequently, the capacitors 208 and 210 are caused to float, allowing the capacitors 208 and 210 to sample the next electric field charge created by the biasing electrodes 205 and altered by the displacement of an object within the electric field. The controller 211 may control the rotational position of the electrical field associated with control electrodes used to sample an electrical charge, and the 1/rev block 216 generates a stationary signal associated with electrical field reflecting the shape of the spindle, and a controller 211.

Once signal φ1 goes high, switches 201 may close. As a result, biasing electrodes 205 and sensing electrodes 206 are shorted to the ground nodes 204. At the same time, the bias is set, which results in a charge transfer across the floating capacitors 209, which is sampled by the capacitors 208 and 210.

Once signal φ4 goes high, a sigma-delta converter 214 may acquire the sign of the resulting charge on an integrator 212 for further processing. In various embodiments, the integrator 212 may be an operational transconductance amplifier with input and output terminals linked by capacitors 208 and 210. The integrator 212 may integrate a previously stored value in the sigma-delta converter 214 with a currently measured value and store the integrated value in the sigma-delta converter 214. Signal φ2 may go high and cause the switches 202 to close. Accordingly, the charge levels on the sample and hold capacitors 208 and 210 are reset as a result of the short.

Once signal φ1 goes low the switches 201 may open, and once the signal φ3 goes high the switches 203 may close. As a result, the biasing potentials on the biasing electrodes 205 and sensing electrodes 206 are set. At this time, the biasing electrodes 205 may be biased to rotate the electric field to the next electric field rotation. The controller 211 may control the rotational position of the electrical field associated with biasing electrodes 205, and the 1/rev block 216 generates a stationary signal associated with electrical field reflecting the shape of the spindle, which is fed back with sensing electrodes 206.

When signal φ3 goes low once again, the switches 203 are caused to open. Accordingly, the biasing electrodes 205 float once again, which ends the previous clock cycle 230 and initiates the next clock cycle.

In another embodiment, when signal φ2 goes low, the switches 202 may open. Consequently, the capacitors 208 and 210 are caused to float, allowing the capacitors 208 and 210 to sample the next electric field charge created by the biasing electrodes 205 and altered by the displacement of an object within the electric field. Once signal φ3 goes low, switches 203 may open. As a result, biasing electrodes 205 and sensing electrodes 206 are caused to float. Approximately at the same time, signal φ4 goes low in preparation for its next rising edge.

According to one embodiment, once signal φ1 goes high, switches 201 may close. As a result, biasing electrodes 205 and sensing electrodes 206 are shorted to the ground nodes 204. This shorting to ground changes the potential of the biasing electrodes 205 and sensing electrodes 206, which results in a charge transfer across the floating capacitors 209, which is sampled by the capacitors 208 and 210.

In one embodiment, when signal φ4 goes high, a sigma-delta converter 214 may acquire the sign of the resulting charge on an integrator 212 for further processing. In various embodiments, the integrator 212 may be an operational transconductance amplifier with input and output terminals linked by capacitors 208 and 210. The integrator 212 may integrate a previously stored value in the sigma-delta converter 214 with a currently measured value and store the integrated value in the sigma-delta converter 214. Once signal φ2 goes high, the switches 202 may close. Accordingly, the charge levels on the sample and hold capacitors 208 and 210 are reset as a result of the short.

It is appreciated that once signal φ1 goes low, the switches 201 may open, and once signal φ3 goes high, switches 203 may close. As a result, the biasing potentials on the biasing electrodes 205 and sensing electrodes 206 are set. At this time, the biasing electrodes 205 may be biased to rotate the electric field to the next electric field rotation.

When signal φ2 goes low once again in the next clock cycle, the switches 202 are caused to open. Accordingly, the capacitors 208 and 210 are caused to float once again, ending the previous clock cycle and initiating the next clock cycle.

It is appreciated that 32 biasing electrodes 205 may be used to create 32 electric field positions. For each electric field position, the circuit may complete one clock cycle. As a result, an electric field may be created for each of the 32 positions and the electric field may be sampled for each of the 32 positions.

In some embodiments, the sigma-delta converter 214 may include multiple registers to store a value corresponding to each position of the electric field. For example, if there are 32 electric field positions, the sigma-delta converter 214 may include 32 registers to store an electric field strength value that corresponds to each position. In various embodiments, when the electric field has completed one full revolution and begins a next revolution, the values in the sigma-delta converter may be overwritten by the average value of the previously stored measurement and the current measurement. As a result, the measurements of each position of an object may be oversampled.

Accordingly, the sensors along with the converter may determine whether displacement of spindle has occurred. Moreover, the sensors and the converter may determine the position of the displacements and their magnitude. The determined information may be transmitted to the filter, e.g., filter 130. According to one embodiment, the filter 130 may be a code modulator as described with respect to FIG. 3.

Figure 3:
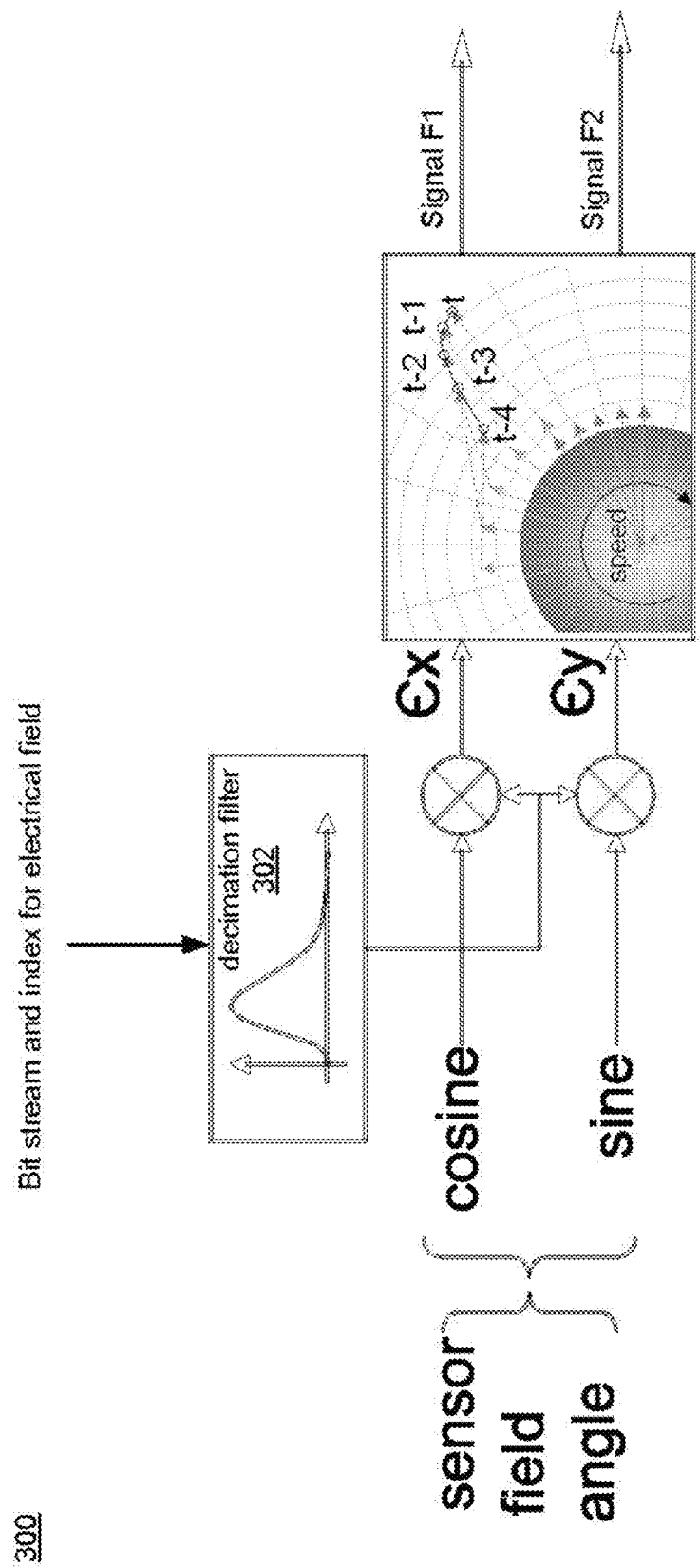
FIG. 3 shows an exemplary code modulator in accordance with one embodiment.

Referring now to FIG. 3, an exemplary code modulator in accordance with one embodiment is shown. According to one embodiment, a decimation filter 302 of the code modulator 300 receives a bit stream associated with the amount of displacement and it further receives a position of the electrical field associated with the position of the displacement. The decimation filter 302 reduces the number of samples and filters out the noise. The instantaneous velocities in X and Y directions are calculated using the cosine and sine respectively. The code modulator 300 outputs two signals in this instance, e.g., signal F1 and signal F2, each associated with a dominant mode. Accordingly, it is appreciated that if one desires to remove three dominant modes, the code modulator 300 outputs three signals. In various embodiments, the code modulator 300 may output any number of signals corresponding to any number of desired modes. In further embodiments, the desired modes may include modes other than dominant modes, e.g., minor modes. The output of the code modulator 300 is transmitted to the actuator 140.

Figure 4:
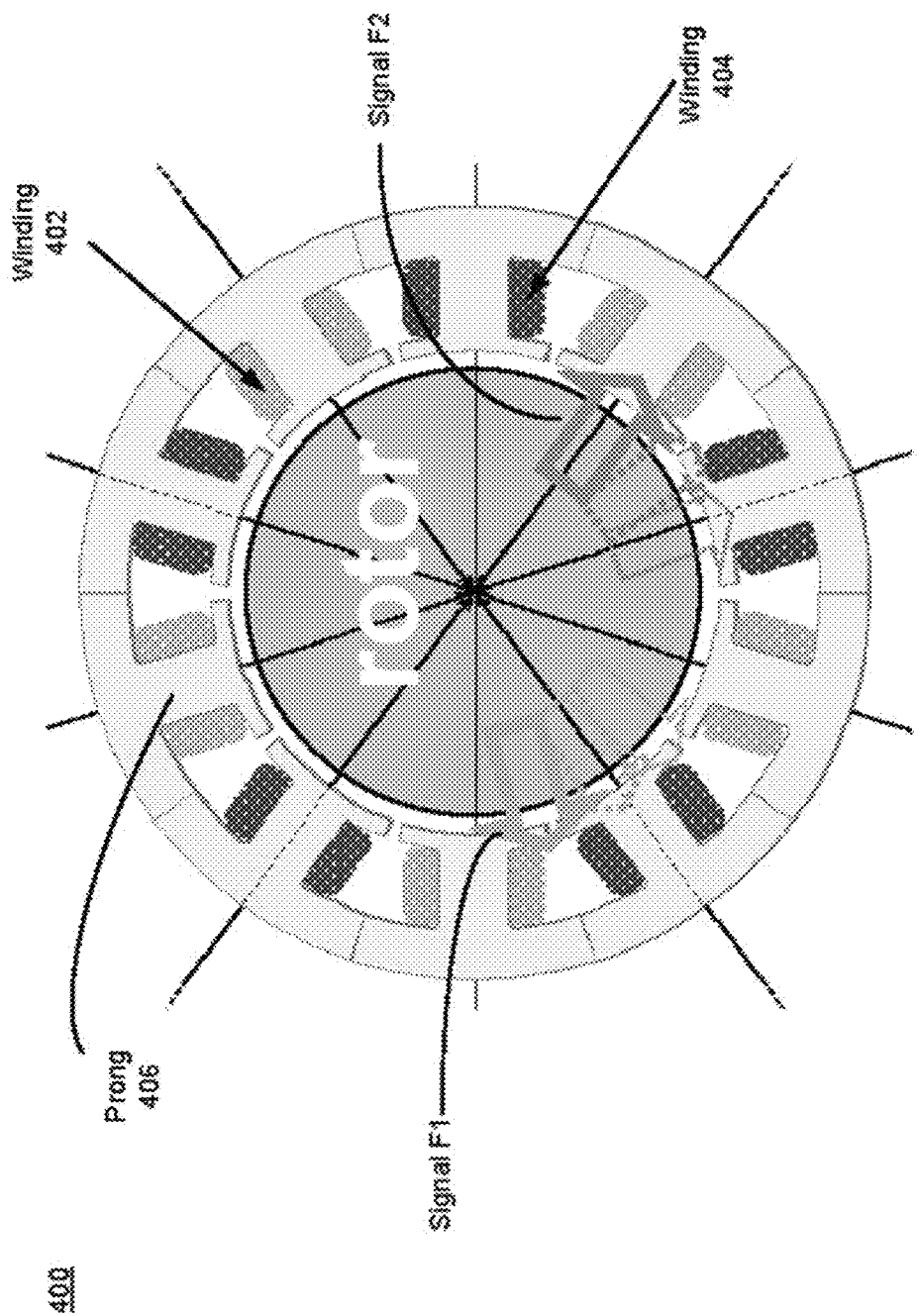
FIG. 4 shows an actuator in accordance with one embodiment.

Referring now to FIG. 4, an actuator 400 in accordance with one embodiment is shown. The actuator 400 may include a plurality of stator teeth 406. The gap between the teeth 406 and the rotor may range between 0.1 mm to 1.0 mm, according to one embodiment.

Windings 402 and 404 may be wrapped around each tooth to form a respective coil each. It is appreciated that in this embodiment, coil 402 is even and coil 404 is odd. Even and odd are referred to as the direction of the magnetic field or magnetic flux created by a current flowing in the winding of each respective coil. Other coils associated with other teeth may also be either odd or even and the number of windings for each may be equal to either coil 402 or 404 respectively. However, it is appreciated that it is not necessary for all even coils to have the same number of windings and it is further appreciated that it is not necessary for all odd coils to have the same number of windings. For example, one even coil may have 10 windings whereas another even coil may have 12 windings. As such, the number of even or odd coils, and the number of windings for each as described herein are exemplary and not intended to limit the scope of the present invention.

In this embodiment, the actuator 400 is a 2×5 phase coils where 2 indicates odd/even coils. In this embodiment, the even coils are wound clockwise whereas the odd coils are wound counterclockwise. It is appreciated that the direction of winding described herein is exemplary and not intended to limit the scope of the present invention. Signals F1 and F2 depict the two signal forces applied by the actuator to the spindle in order to compensate and adjust the measured displacement and to dampen the force.

It is appreciated that signal force F1 and F2 are snapshots in time and that they change over time as displacement changes and as the spindle spins. For example, possible future signals F1 and F2 are depicted as dashed arrows. It is appreciated that the signals F1 and F2 shown are exemplary and depending on the measured displacement, etc., the position and magnitude of the signals F1 and F2 may change. It is appreciated that signals F1 and F2 may be pulse width modulation signals.

Figure 5:
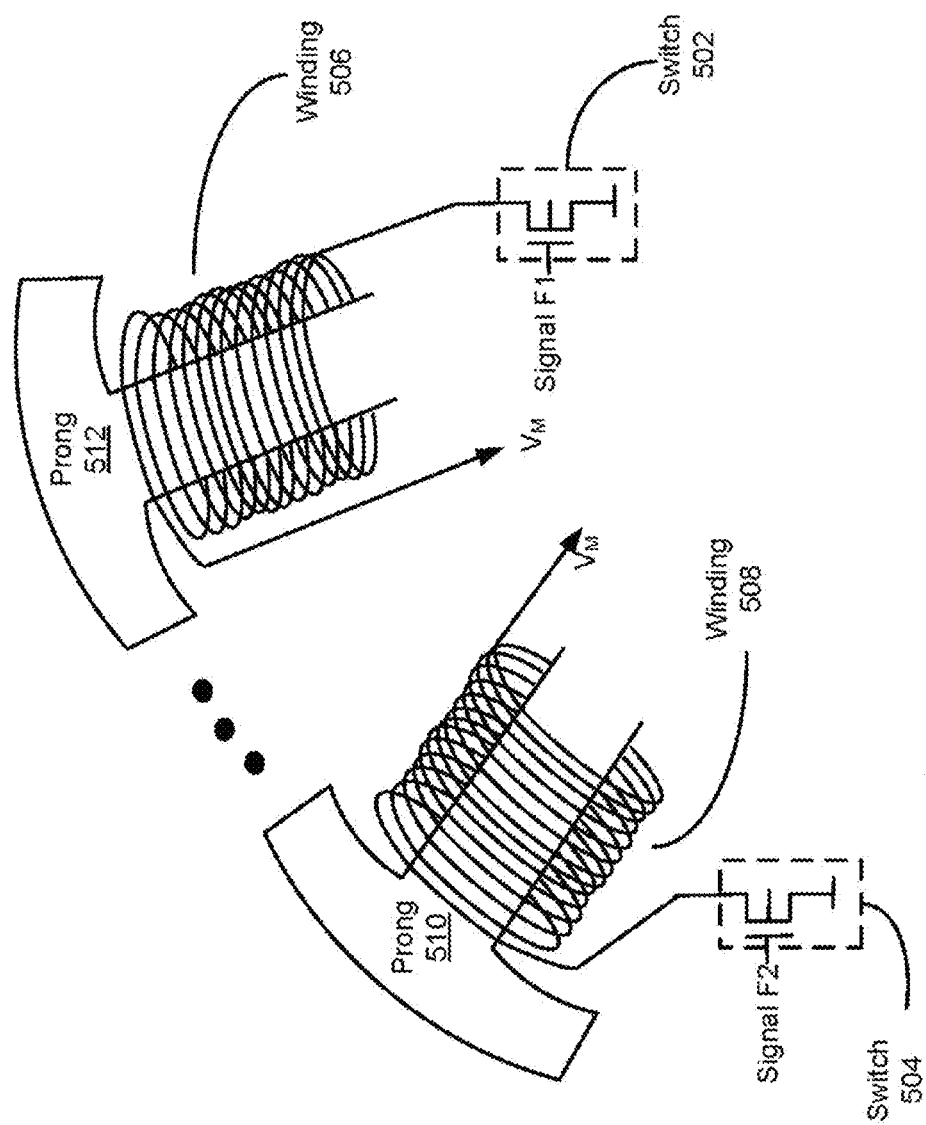
FIG. 5 shows a more detailed actuator in accordance with one embodiment.

Referring now to FIG. 5, a more detailed actuator 500 in accordance with one embodiment is shown. The actuator 500 may include a plurality of teeth, two of which are shown 510 and 512. Each tooth may have a corresponding coil winding associated with it, e.g., winding 506 associated with tooth 512 and winding 508 associated with tooth 510. It is appreciated that the windings shown may be odd or even. However, for illustration purposes it is presumed that coil winding 506 is even and wound in clockwise direction and coil winding 508 is odd and wound in a counterclockwise direction. One side of each coil winding may be coupled to a switch. For example, coil winding 506 may be coupled to switch 502 and coil winding 508 may be coupled to switch 504. The other side of the coil winding may be coupled to a voltage signal source, e.g., $V_M$.

It is appreciated that even though the same voltage signal source is shown being coupled to these coil windings, different voltage signal source may be coupled, e.g., $V_M$ for one and $-V_M$ for another one. It is also appreciated that the winding, e.g., clockwise or counterclockwise direction and odd or even coil windings, are merely exemplary and not intended to limit the scope of the present invention.

It is appreciated that the gate of each switch, e.g., gate of switches 502 and 504, may be coupled to the signal, e.g., signal F1 and signal F2, received from the modulator. It is appreciated that the received signals may be pulse width modulation signals and as such the coils of the actuator perform coil to coil pulse width modulation micro stepping. In response to receiving the signals F1 and F2 exceeding a given threshold, switches 502 and 504 close causing $V_M$ to be coupled, thereby causing the current to flow through the coil windings. Flow of current causes an electrical field and therefore a force that is applied to the spindle. The applied force compensates and adjusts for the measured displacements and dampens, which reduces non-repetitive run-outs.

Figure 6:
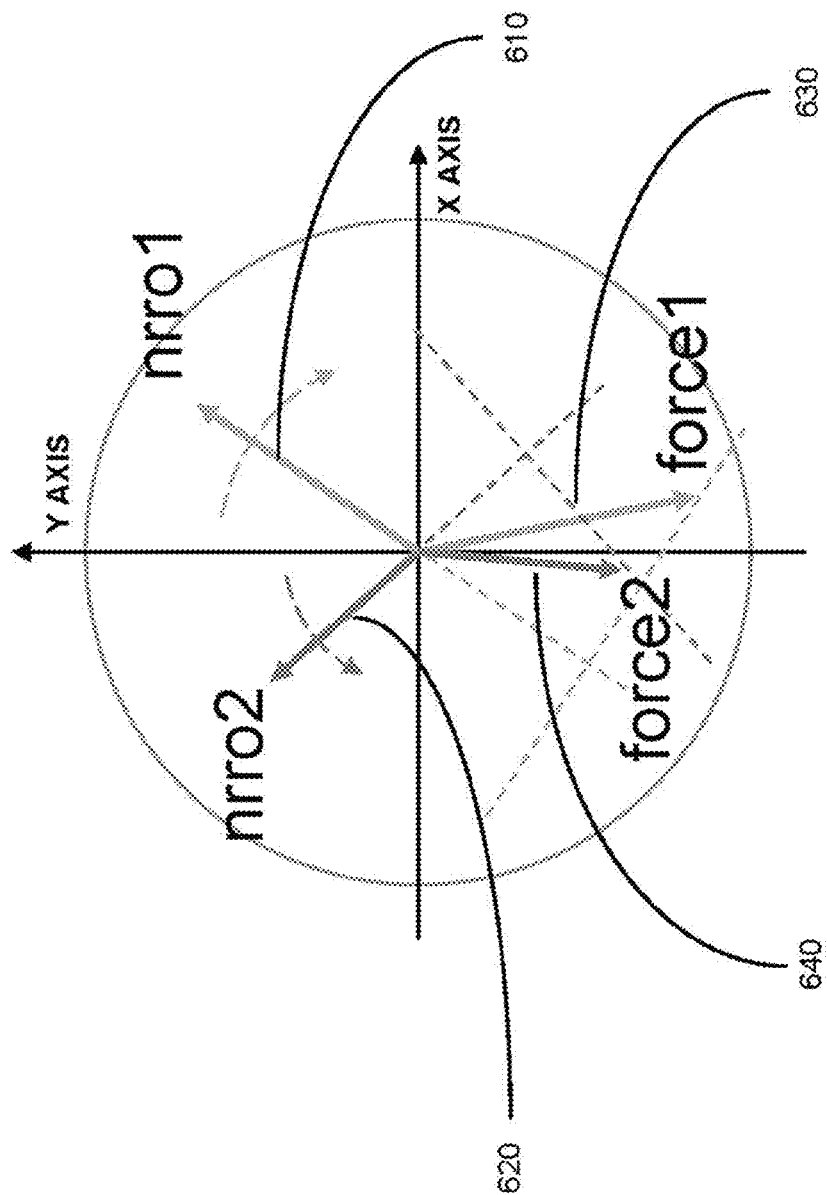
FIG. 6 shows an exemplary diagram of the displacement force and the adjustment force in accordance with one embodiment.

Referring now to FIG. 6, an exemplary top view diagram of the displacement force and the adjustment force in accordance with one embodiment is shown. In this example, two dominant forces contributing to non-repetitive run-outs are shown as nrro1 610 and nrro2 620. In one embodiment, the forces 630 and 640 to be applied to the spindle in order to compensate and adjust for displacements and non-repetitive run-outs are perpendicular to the nrro1 and nrro2. However, it is appreciated that in various embodiments the forces 630 and 640 may not necessarily be perpendicular to the non-repetitive run-outs (as shown). The cancellation forces 630 and 640 may be used to dampen the two dominant modes, in this instance. It is appreciated that the number of cancelation forces varies if the number of dominant modes to be dampened is varied. For example, if three dominant modes are to be dampened then the number of forces applied may be also be three.

Figure 7:
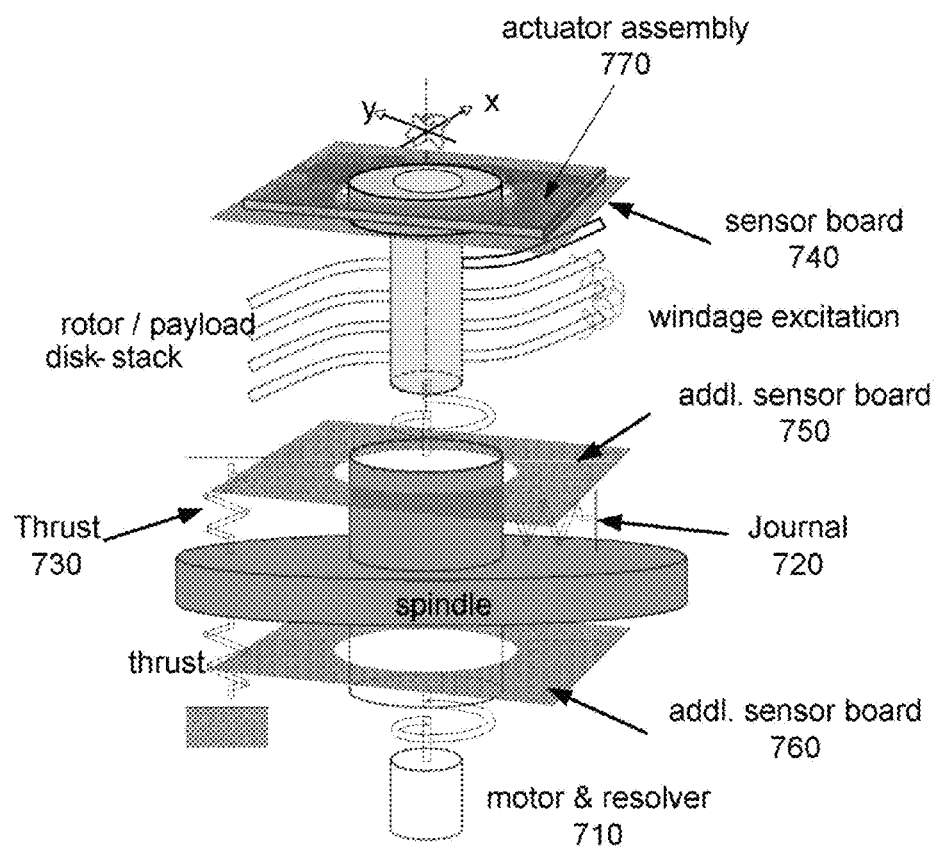
FIG. 7 shows a system in accordance with one embodiment.

Referring now to FIG. 7, a system 700 in accordance with one embodiment is shown. System 700 includes a motor and resolver 710, journal bearing 720, thrust bearing 730, sensor board 740, optional sensor boards 750-760, and an actuator assembly 770. According to one embodiment, rotor/payload disk-stack may be coupled to the spindle. The motor and resolver 710 rotates, thereby rotating the spindle. As a result, the payload or the disk stack may experience windage excitation. The journal bearing 720 and the thrust bearing 730 may be used to reduce windage excitation and non-repetitive run-outs. The sensor board 740 is similar to the sensor board 110, 200 described above. The sensor board 740 may include the sigma delta component, as described above.

System 700 may include a filter board (not shown). The filter board may be integrated within the sensor board 740 in one embodiment or it may be integrated within the actuator assembly 770 in another embodiment. According to one embodiment, the filter board is a separate board and not integrated within either of the sensor board 740 or the actuator assembly 770. The filter board operates similar to that of the filter 130 or the code modulator 300.

The actuator assembly 770 operates similar to that of actuator 140, 400, or 500, as described above. The actuator assembly 770 uses the information from the sensor board 740 and the filter board and applies an appropriate force at an appropriate position to compensate for the measured displacements. As such, non-repetitive run-outs are reduced and dampening is increased.

It is appreciated that in this exemplary embodiment, additional sensor boards 750 and 760 may also be used to measure displacements, etc., for various sections of the rotating body and for more accurate measurement. However, it is appreciated that the use of the additional sensor boards 750 and 760 is optional. The additional sensor boards 750 and 760 may operate similar to that of sensor board 740.

Figure 8:
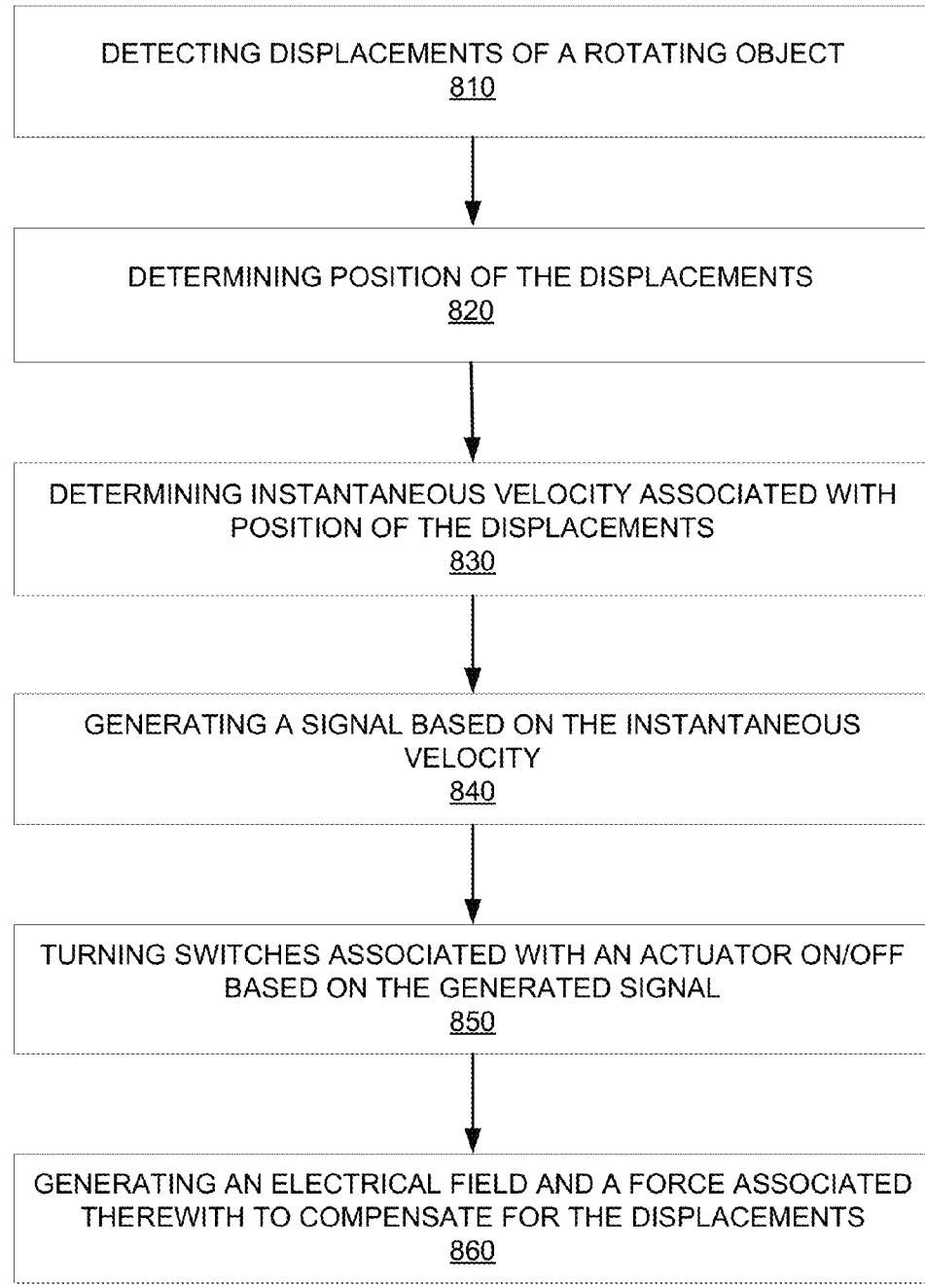
FIG. 8 shows an exemplary flow diagram in accordance with one embodiment.

Referring now to FIG. 8, an exemplary flow diagram 800 in accordance with one embodiment is shown. At step 810, displacements of a rotating object, e.g., spindle, is determined. For example, a sensor board as described above may be used. At step 820, position at which the detected displacements occur is determined. According to one embodiment, a sigma delta circuitry may be used.

At step 830, the instantaneous velocity associated with the position of the displacements is determined. According to one embodiment, a filter board or a code modulator, as described above, may be used. At step 840, a signal based on the instantaneous velocity may be generated. The signal may be generated by the filter board or a code modulator, as described above. The signal may be a pulse width modulation signal.

At step 850, an actuator device receives the generated signal. The generated signal is used to turn on/off the switches associated with the actuator device. Turning the switches on/off causes the current to flow through the appropriate tooth(s) of the actuator, e.g., appropriate winding coil. At step 860, the current that flows through the appropriate tooth of the actuator generates an electrical field and a force resulting thereof. The generated force is applied to the rotating object, e.g., spindle, thereby compensating for the measured displacements and dampening the system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An apparatus comprising:
   a plurality of sensors operable to detect displacements of a spindle in motion;
   a converter coupled to said plurality of sensors, wherein said converter is operable to determine respective positions of said displacements;
   a filter operable to determine instantaneous velocity associated with said positions of said displacements and further operable to determine a first force based on said instantaneous velocity wherein the determining by the filter is based on the received said positions of said displacement and further based on a received position of a rotating electrical field; and
   an actuator operable to apply a second force to said spindle, wherein said second force substantially counteracts said first force and said displacements.

2. The apparatus of claim 1, wherein said plurality of sensors is selected from a group consisting of a hall sensor, a charge coupling sensor, and a microphone.

3. The apparatus of claim 1, wherein said actuator is selected from the group consisting of an air jet, a piezo element, and an electromagnet.

4. The apparatus of claim 1, wherein said actuator is an electromagnet actuator and comprises odd and even coils wound clockwise and counterclockwise.

5. The apparatus of claim 1, wherein a gap between said actuator and said plurality of sensors ranges between 0.1 mm to 1.0 mm.

6. The apparatus of claim 1, wherein said plurality of sensors comprises at least 32 sensors.

7. The apparatus of claim 1, wherein said filter comprises a decimation filter.

8. The apparatus of claim 1 further comprising:
   a plurality of switches, wherein each switch of said plurality of switches is associated with a coil winding associated with a tooth of said actuator, and wherein switches of said plurality of switches turn on and off responsive to said first force to generate said second force.

9. The apparatus of claim 1, wherein said converter comprises a sigma delta component.

10. An apparatus comprising:
    a circuit operable to detect displacements of a rotating object, wherein said circuit is operable to detect a positions of said displacements, and wherein said circuit is further operable to generate a signal associated with said position and said displacements;
    a code modulator operable to generate a modulated signal based on said position and said displacements; and
    an actuator operable to apply a force to said rotating object, wherein said force is based on activation of a subset of coils in a plurality of coils, wherein the activation is based on said modulated signal, and wherein the plurality of coils comprises an even winding coil and an odd winding coil, and wherein at least one coil in the plurality of coils has a different number of windings than another coil in the plurality of coils.

11. The apparatus of claim 10, wherein said modulated signal comprises a force pulse code modulation signal.

12. The apparatus of claim 10, wherein said force substantially adjusts said displacements.

13. The apparatus of claim 10, wherein said circuit comprises a plurality of sensors and a sigma delta component.

14. The apparatus of claim 10, wherein said actuator is an electromagnet actuator and comprises coils wound clockwise and counterclockwise.

15. The apparatus of claim 10, wherein a gap between said actuator and said circuit ranges between 0.1 mm to 1.0 mm.

16. The apparatus as described by claim 10 further comprising:
    a plurality of switches, wherein each switch of said plurality of switches is associated with a coil winding associated with a tooth of said actuator, and wherein switches of said plurality of switches turn on and off responsive to said modulated signal.

17. An apparatus comprising:
    a first plurality of teeth having a first plurality of coil windings;
    a second plurality of teeth having a second plurality of coil windings; and
    a plurality of switches, wherein
    each switch of said plurality of switches is associated with a tooth of said first plurality of teeth or a tooth of said second plurality of teeth,
    at least one switch of said plurality of switches associated with said first plurality of teeth and at least one switch of said plurality of switches associated with said second plurality of teeth are operable to be turned on in response to a signal,
    said signal is associated with a force, a position of displacement of a rotating object, and an instantaneous velocity at said position of displacement, and
    said turning on of said switches is operable to apply a cancelation force to said rotating object to substantially adjust for said displacements.

18. The apparatus of claim 17, wherein
    said first plurality of coils is an odd coil winding in either clockwise or counterclockwise direction around said first plurality of teeth,
    said second plurality of coils is an even coil winding around said second plurality of teeth, and
    said second plurality of coils is in clockwise direction if said first plurality of coils is in counterclockwise direction or in counterclockwise direction if said first plurality of coils of is in clockwise direction.

19. The apparatus of claim 17, wherein said cancelation force is an electromagnetic force.

20. The apparatus claim 17, wherein said signal comprises a force pulse code modulation signal.

* * * * *